United States Patent Office 3,514,442
Patented May 26, 1970

3,514,442
PROCESS FOR MANUFACTURING CERTAIN N-CONTAINING DERIVATIVES OF CELLULOSE
Brazelton Fulkerson and John W. Mench, Rochester, N.Y., assignors to Eastman Kodak Company, Rochester, N.Y., a corporation of New York
No Drawing. Filed July 17, 1967, Ser. No. 653,645
Int. Cl. C08b 3/00, 11/00, 13/00
U.S. Cl. 260—214       3 Claims

ABSTRACT OF THE DISCLOSURE

In processes involving the reaction of organic nitrogen-containing bases with unsaturated cellulose esters or ethers, it has been discovered that the presence of a small amount of anions from a strong acid in the reaction medium during the reaction significantly increases the rate of the desired reaction.

This invention relates to improved processes for manufacturing nitrogen-containing derivatives of cellulose, which processes involve the reaction of certain N-containing organic bases with unsaturated esters or ethers of cellulose.

Processes for reacting organic N-containing bases (which contain at least one H—N group in their molecule) with unsaturated esters and/or ethers of cellulose (such as cellulose crotonate, for example) have been known for many years. Such processes simply involve the blending of the unsaturated cellulosic material with the N-containing base, usually in the presence of a non-reactive solvent system, at slightly elevated temperatures for a period of time sufficient to result in the introduction of the desired amount of nitrogen into the cellulosic product. It is believed that the reaction proceeds via the formation of a N—C bond at the place (in the cellulosic raw material) where the unsaturation had been:

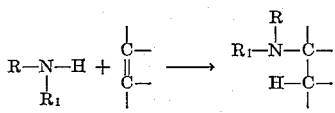

After the reaction has been carried out to the desired extent, any excess organic base and/or solvent can be separated from the cellulosic material in any of several conventional ways. Typical of such proceses and reactants are those described in detail in U.S. Pat. 2,072,870 (the disclosure of which is incorporated by reference into the present disclosure).

It has now been discovered that when the aforementioned processes are carried out in a system in which both the organic base and the unsaturated cellulosic raw material are soluble, the rate of the desired reaction can be significantly increased by the additional presence, in the reaction medium, of at least a catalytic amount of an acid anion having a molecular weight below about 200.

The acid anion can be introduced into the reaction mixtures of this invention in any of a number of convenient ways without detracting from the excellent results that can be obtained by practicing this invention. For example, it can be introduced in the form of the free acid (such as acetic acid and hydrochloric acid), or in the form of the acid salt of the amine (which is sometimes more convenient to handle than the liquid acids, per se). Apparently, the presence of any anion of a strong acid (wherein the corresponding acid has a Ka of at least about $1 \times 10^{-6}$) drived from an acid having a molecular weight below about 200 at levels of at least about 0.05 mole percent of acid anion (based on the moles of unsaturated cellulosic material in the reaction medium), and which is soluble in the reaction medium to at least that extent, can be used in the successful practice of this invention. Typical examples of such useful acid anions include, but are not limited to, acetic, hydrochloric, sulfuric, benzoic, benzene sulfonic acid anions. Of these, the use of acetic, hydrochloric, and propionic acid anions is preferred. Preferred levels of acid anion usage in the solvent systems (reaction media) of this invention lie between about 0.1 and about 25 mole percent, based on the moles of cellulosic material in the reaction media. Although it is not necessary, it is preferred that the acid anions be present in the reaction media during substantially the entire period of the reaction between the N-containing organic base and the unsaturated cellulosic material.

As it was pointed out above, any solvent can be used in the present processes that has been successfully used heretofore in processes for reacting any of the N-containing bases with any of these unsaturated cellulosic materials. Thus, any solvent that is essentially non-reactive with the organic base, the cellulosic material, or the acidic catalyst of the present invention, and in which at least a significant portion of these materials is soluble, can be used in the formation (and maintenance) of the reaction media described above. Typical, nonlimiting, examples of useful solvents include acetone, dimethylformamide, methyl ethyl ketone and 1,4-dioxane. On the other hand, if it is desired to use the organic base in excess of theoretical amounts, those organic bases that are liquids at temperatures below about 100° C. can be utilized as solvents, themselves.

The nitrogen-containing cellulosic derivatives that can be manufactured in accordance with the improved processes of this invention are the products of the reaction of organic nitrogen-containing bases (wherein there is at least one replaceable hydrogen connected directly to a nitrogen atom; thus, H—N<) with unsaturated cellulose derivatives such as the well-known unsaturated cellulose ethers, unsaturated cellulose esters and unsaturated mixed ethers and esters of cellulose. Useful unsaturated cellulosic materials may be unsaturated esters, ethers, or even mixed ether-esters of cellulose. For example, the esters may be aliphatic (substituted or unsubstituted, and if substituted, are preferably hydroxy or carboxylic acid substituted, such as cellulose crotonate, cellulose maleate, cellulose oleate, cellulose cinnamate, cellulose tiglate, cellulose linoleate, or cellulose ricinoleate). Unsaturated mononuclear aryl and aralkyl esters of cellulose such as cellulose cinnamate and cellulose tetrahydrophthalate are also useful. The useful unsaturated cellulose ethers can be the simple unsaturated aliphatic ethers such as allyl cellulose, vinyl cellulose, or crotonyl cellulose or of the cyclic series, as for example styryl cellulose. Not all the substituent groups on the cellulose molecule need be unsaturated. Thus, in addition to the unsaturated ester and/or ether substituents or groups, the useful cellulose molecules can contain saturated ester and ether groups, as for example acetyl, formyl, propionyl, butyryl, isobutyryl, benzoyl, methyl, ethyl, propyl, benzyl; hydroxyalkyl groups such as hydroxymethyl, hydroxyether, or hydroxypropyl; and mixtures of any of these. Two or more unsaturated ester or ether groups and/or two or more saturated ester or ether groups may be present in the cellulose molecules that are reacted with the organic bases as described above. Similarly unsaturated mixed ether-esters can be employed, the whole or part of either the ester or ether groups (or both) being unsaturated.

The organic bases with which the unsaturated cellulose derivatives are reacted in accordance with these procedures can be aliphatic, alkyl, aromatic, or alicyclic, and preferably should contain from 1 to about 20 carbon atoms. They must contain at least one hydrogen atom connected directly to a nitrogen atom, and are preferably either primary or secondary organic amines. Typical, non-limiting examples of useful organic bases are meythlamine, ethylamine, propylamine, amylamine, hexylamine, dimethylamine, diethylamine, ethanolamine, diethanolamine, 2,2-dicloroethylamine, cyclohexylamine, benzylamine, methyl benzylamine, piperidine, morpholine, and the like.

EXAMPLE 1

A mixture of 100 parts of cellulose propionate crotronate (containing 27% propionyl and 25% crotony), 250 parts of morpholine and 5 parts of hydrochloric acid (catalyst) is heated under reflux in a conventional glass lined reactor for 5 hours at 85° C. The resulting reaction mixture is then cooled to 35° C. and blended with 900 parts of acetone. The resulting blend is then poured slowly into 15,00 parts of distilled water (to precipitate the N-containing cellulosic product). The precipitate is recovered by conventional filtration procedures, and washed 7 times with 1000 parts each of water.

The resulting product, cellulose propionate 3-morpholinobutyrate, (as can any of the N-containing cellulosic products) can be stabilized against spontaneous insolubilization (in common solvents such as acetone) that might otherwise occur by blending it with a small amount of an antioxidant, in accordance with the procedures detailed in copending United States patent application Ser. No. 653,646, filed concurrently herewith, now abandoned.

EXAMPLE 2

Into a conventional glass lined reactor are blended 1000 parts of cellulose acetate crotonate (containing 25.5% crotonyl and 1.5% hydroxyl, and having an intrinsic viscosity in acetone of 1.18), 2500 parts of acetone, 625 parts of morpholine, and 139 parts of glacial acetic acid. The resulting solution is warmed to 60° C. and stirred continuously. Once each hour it is sample. The sample is analyzed to determine how much of the organic base had reacted with the unsaturated cellulosic material (by determining the percent N in the cellulosic fraction of the sample).

A similar mixture is prepared, but no acetic acid is used. It, too, is sampled hourly during the reaction that is carried out at 60° C. In Table 1, below, the rates of reaction are compared:

TABLE 1.—EFFECT OF ACID ANION (ACETIC) ON REACTION RATE

| Hours, reaction time | Percent N in product, no acetic (control) | Acetic anion present |
|---|---|---|
| 1 | 0.57 | 1.56 |
| 2 | 0.93 | 2.23 |
| 3 | 1.54 | 2.70 |
| 7 | 2.20 | 3.16 |

Similarly increased rates of reaction can be observed in the various processes to which this invention relates (i.e., when organic bases other than morpholine and unsaturated cellulosic esters and ethers other than cellulose crotonates) in the presence of acid anions other than acetic.

We claim:
1. In a process for manufacturing nitrogen-containing cellulose derivatives, which process comprises reacting together in a non-reactive common solvent (a) an unsaturated derivative of cellulose selected from the group consisting of unsaturated cellulose esters, unsaturated cellulose ethers and unsaturated mixed esters and ethers of cellulose and (b) an organic base containing at least one H—N group in its molecule; the improvement which comprises reacting together (a) and (b) in the presence of at least about 0.05 mole percent, based on the amount of (a) dissolved in said solvent, of an acid anion derived from a strong acid having a molecular weight below about 200 and having a Ka of at least about $1 \times 10^{-6}$.

2. An improved process as in claim 1, wherein the amount of said acid anion in said solvent is between about 0.1 and about 25 mole percent.

3. An improved process as in claim 2, wherein said anion is selected from the group consisting of acetic, propionic, hydrochloric and sulfuric acid anions.

References Cited

UNITED STATES PATENTS

| 1,494,472 | 5/1924 | Farrow | 106—178 |
| 2,072,870 | 3/1937 | Dreyfus | 260—227 |
| 2,233,475 | 3/1941 | Dreyfus | 260—224 |
| 2,460,925 | 2/1949 | Decker | 106—189 |
| 2,709,638 | 5/1955 | Babiarz et al. | 260—224 |
| 3,041,329 | 6/1962 | Campbell et al. | 260—227 |
| 3,362,847 | 1/1968 | Day | 106—178 |
| 3,393,968 | 7/1968 | Segal | 260—231 |

DONALD E. CZAJA, Primary Examiner

R. W. GRIFFIN, Assistant Examiner

U.S. Cl. X.R.

260—226, 227, 231